April 24, 1951     A. N. IKNAYAN     2,550,193
INNER TUBE

Filed Dec. 31, 1947     2 Sheets-Sheet 1

INVENTOR.
ALFRED N. IKNAYAN
BY Henry P. Truesdell
ATTORNEY

April 24, 1951 A. N. IKNAYAN 2,550,193
INNER TUBE
Filed Dec. 31, 1947 2 Sheets-Sheet 2

INVENTOR.
ALFRED N. IKNAYAN
BY Henry P. Truesdell
ATTORNEY

Patented Apr. 24, 1951

2,550,193

UNITED STATES PATENT OFFICE 2,550,193

INNER TUBE

Alfred N. Iknayan, Indianapolis, Ind., assignor to United States Rubber Company, New York, N. Y., a corporation of New Jersey Application December 31, 1947, Serial No. 794,867

4 Claims. (Cl. 152—349)

1

This invention relates to inner tubes, and in particular it relates to inner tubes in combination with a flap which forms a part thereof.

In the assembly of a pneumatic tire, inner tube, and rim, difficulty has been encountered in chafing of the inner tube adjacent to a point where the tire bead rests upon the seat of the rim. Particularly in the larger size passenger tires, the strain imposed upon the tire results in a slight relative movement between the tire bead and the rim at a point adjacent to the inner tube. In many cases, this slight movement over a period of time becomes injurious to the tube causing chafing at this region. Consequently, there is danger of failure and sudden deflation of the inner tube with its resulting peril to the vehicle and its occupants.

The danger of inner tube injury at the junction between the tire bead and the rim is particularly prevalent in connection with the conventional drop center type of rim. With drop center rims, the inner tube is normally manufactured so that the bottom or rim portion of the tube is approximately even with the rim diameter of the tire beads. Therefore, upon inflation of the inner tube, the rim portion of the tube blows down into the well of the rim resulting in a stretching of the wall of the inner tube in the region of the rim. When rubber is under stress, such as being stretched, it is more susceptible to injury by chafing than rubber in its relaxed state. Most conventional tire assemblies for passenger cars use the drop center type of rim and consequently the stretching condition of the wall of the inner tube in the region of the rim and tire bead is prevalent with most passenger vehicles.

The use of flaps are helpful in avoiding injury to the inner tube. However, it is difficult and impracticable to assemble a flap with a tire on a drop center rim. It has heretofore been proposed to provide flaps of rubber composition attached integrally to the wall of the inner tube constituting free ends which overlap the junction between the tire bead and the rim. This, however, is not very satisfactory because of mounting problems in which it is difficult to insure that the free end flaps lie in the proper position for which they were intended after the tube is inflated. For example, the free end flaps during the mounting operation frequently become folded back on themselves or otherwise distorted and therefore they constitute in themselves a hazard which may be injurious to the inner tube.

2

I have found that the provision of flaps which are integral with the inner tube, and which lie adjacent to the junction between the tire bead and the rim, can be made successful as the free ends of the oppositely disposed flaps are joined together in a manner which will prevent any substantial stretching of the free ends of the flaps.

This may be accomplished by joining the ends of the flaps together with a thin or more elastic rubber composition than that of which the flaps are formed. By such a construction, it is possible to provide an inner tube which in appearance and for mounting purposes is comparable to the conventional inner tube.

Among the objects of my invention are to provide an inner tube for a pneumatic tire adapted for mounting on a drop center rim in which the inner tube is provided with flaps of rubber composition which remain in a relaxed state and cover the junction between the tire bead and the rim to thereby minimize any chafing of the inner tube which may occur in this region; to provide an inner tube which may be assembled with a tire and a rim in substantially the same manner as with conventional inner tubes; to provide such an inner tube which does not include free ends extending from the tube and which may impair the mounting operation; to provide an inner tube which includes a layer of rubber composition which lies in a relaxed state over the junction formed between the tire bead and the rim; and to provide an inner tube of the character described which will function efficiently and which may be manufactured economically.

These and other objects and advantages will appear more fully in the following detailed description when considered in connection with the accompanying drawings, in which.

Figure 1:
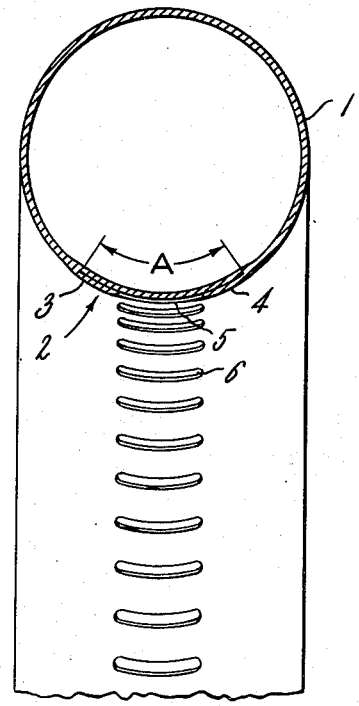
Figure 1 is a transverse view, in section, of a portion of an inner tube embodying the features of my invention.

With reference to Figure 1 of the drawings, I show an embodiment of my invention in the form of an inner tube 1 which constitutes the principal body of the completed tube. This inner tube 1 is formed of rubber composition and is in the form of an annulus having a substantially circular cross-section in accordance with conventional forms of inner tubes.

While reference is made to rubber and rubber compositions, it is to be understood that the invention contemplates synthetic rubber as well as natural rubber. By synthetic rubber I refer to those modified butadiene-1,3-derived rubber materials which lie within the class of neoprene (polychloroprene), Buna S (rubber copolymer of butadiene-1,3 and styrene), Buna N (rubbery copolymer of butadiene-1,3 and acrylonitrile), butyl (rubber copolymer of a major proportion of a monolefine, e. g., isobutylene, with a minor proportion of a conjugated 1,3-diene, e. g., isoprene).

Forming an integral part of the inner tube 1 is a rim strip 2 having side portions 3 and 4 and a central portion 5. The marginal edges of the side portions 3 and 4 are attached in integral relation to the inner tube 1 while the remaining portion of the rim strip is free from attachment with the inner tube 1.

Figure 4:
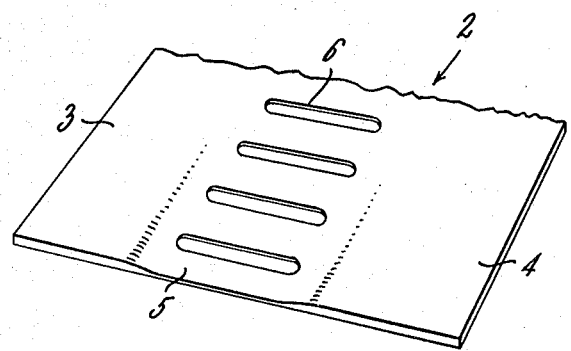
Figure 4 is a perspective view, in section, of the rim strip forming a part of the completed tube.
Figure 5:
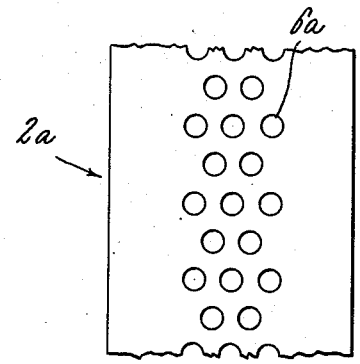
Figure 5 is a plan view illustrating a modified form of rim strip.

The characteristic of the rim strip 2 is such that the central portion 5 is thinner or more elastic than the side portions 3 and 4. This is illustrated in more particularity in Figure 4. Specifically, the side portions 3 and 4 have a thickness of approximately .90 inch, whereas the thickness of the central portion 5 is approximately .040 inch. By this arrangement, the central portion 5 is more susceptible to extension than the side portions 3 and 4. The central portion 5 may be made more extensible by including therein a series of perforations such as elongated slots 6. This still further weakens the central portion 5 so that substantially all of the stretching as hereinafter described will take place within the region 5. The width of the central portion 5 as well as the length of the slots 6 is substantially equal to one-third of the total width of the rim strip 2. It is to be understood that the central portion 5 may be made more extensible by making that portion of a thinner rubber composition or by including perforations therethrough or by combining both the thinner gage material and the perforations or by using composite structures of high and low modulus rubbers. While I have shown slots 6 as constituting the perforations, it is to be understood that various other apertures extending through the wall of the rim strip 2 may be used for this purpose. For example, in Figure 5 I illustrate by way of modification a rim strip 2a having a plurality of perforations in the form of circular apertures 6a extending therethrough. In this modification, the essential requirement is that the perforations 6a be limited to that region of the rim strip 2a which represents a central portion equal to about one third of the total width of the rim strip. I have also found that the perforations should represent an open area in this region of approximately 20%. Good results, however, can be obtained by maintaining these openings to the extent of between 15% and 25% of the total area in the central portion.

The total width of the rim strip is equal to a dimension designated "A" representing approximately 20% of the circumferential distance cross-sectionally of the inner tube. This distance represents a measurement taken on the inner tube when it is unmounted and inflated merely sufficient to expand the tube to circular shape without any substantial stretching of the tube and as shown in Figure 1. While the distance "A" is equal to approximately 20% as stated, it has also been found that good results may be obtained by maintaining this distance within the range of 13% to 27% of the total distance cross-sectionally around the inner tube.

Figure 2:
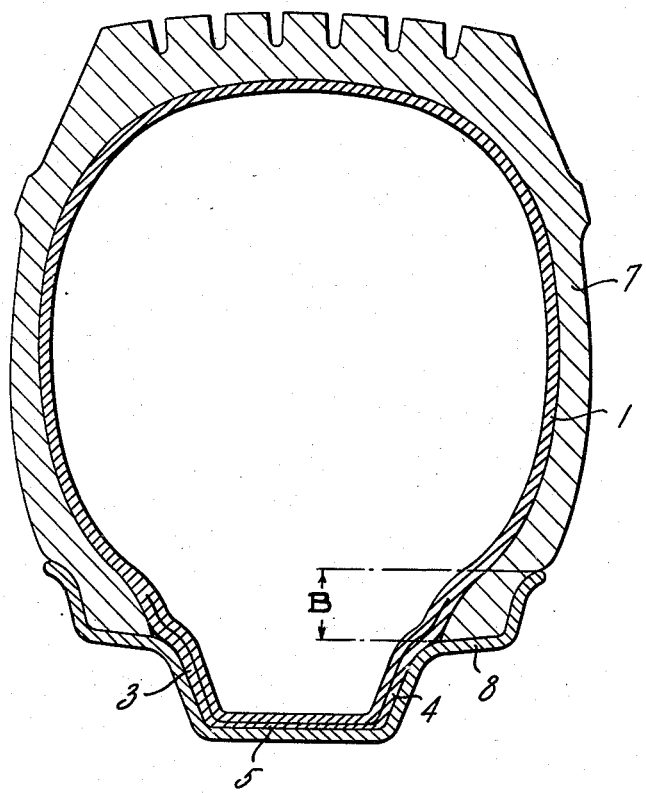
Figure 2 is a transverse view, in section, of an assembly of a tire and rim with an inner tube of my invention illustrating its relationship under normal inflation.

Figure 2 illustrates the inner tube 1 in assembled relation with a pneumatic tire 7 and a rim 8. When so inflated the rim portion of the inner tube 1 expands into the well of the rim 8. In so expanding the inner tube 1, the rim strip 2 being exterior of the tube 1 is likewise expanded. Because of the thinned out portion of the rim strip, substantially all of the stretch of the rim strip lies within the center portion 5. As a result, this leaves the side portions 3 and 4 relatively free from extension stresses and as they are thus in a substantially relaxed state lying over the junction between the tire bead and the rim, any chafing that is caused at this point is insulated from the inner tube 1 by the interposing layers of relaxed rubber 3 and 4. As shown in Figure 2, the junction defining the attachment of the rim strip 2 with the main wall of the inner tube 1 must lie in a critical region. This region is adjacent to the tire bead and is within a zone defined by the outer diameter of the rim flange and the diameter of the bead seat of the rim. This zone is indicated by the dimension "B" in Figure 2. The reason for limiting the location of this junction is that it is essential that the junction lie adjacent to that portion of the tire in which no flexing occurs when the tire is in operation. The distance represented by the letter "B" indicates this non-flexing zone.

Figure 3:
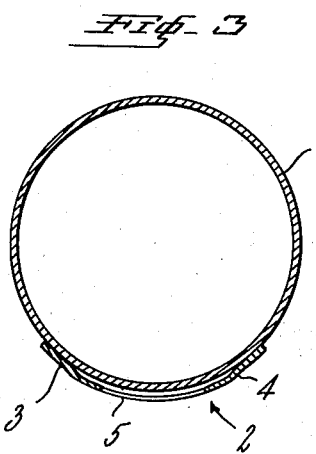
Figure 3 is a transverse view, in section, of the inner tube illustrated in an unvulcanized state and showing a rim strip attached thereto.

Figure 3 illustrates one method by which the present tube is manufactured. The inner tube 1 at this stage is intended to be in its unvulcanized state. The rim strip 2 also of unvulcanized rubber composition is attached to the inner tube 1 along a marginal end portion of the side strips 3 and 4. This may be accomplished by stitching the two unvulcanized rubber compositions together while in their unvulcanized state. It may be necessary to freshen the stock by the application of gasoline prior to joining the strips together. In some cases it may be desirable to use cement at the joining portions in order to facilitate adhesion.

In the proper operation of the subject inner tube, it is essential that the principal central portion of the rim strip 2 should not adhere to the inner tube 1. Therefore, to prevent adhesion between these two surfaces, one or both of the adjoining surfaces not intended for adhesion are coated with a permanent non-adhesive paint. For this purpose, any of the conventional permanent non-adhesive paints may be used, for example, a water paint in which the principal ingredients are mica, soapstone, or the like. When the inner tube is completely assembled with the rim strip, it is placed in a mold and vulcanized. During this operation the marginal edge portions of the strips 3 and 4 become integrally united with the inner tube 1 while the rim portion of the rim strip is readily separable from adhesion with the tube 1 because of the presence of the non-adhesive paint.

It is to be understood that the rim strip 2 may be applied to an inner tube which has already been vulcanized. In such case, however, it may be necessary to buff that portion of the vulcanized tube to which the rim strip is to be attached. Also, it is essential to apply cement to the rim strip to assure an adequate union with the inner tube during subsequent vulcanization.

Associated with the inner tube 1 is a conventional valve stem (not shown). It is to be understood that such a conventional valve stem will be attached directly to the inner tube 1 and may project therefrom through any of the apertures such as 6. It is merely essential that the valve stem does not interfere with the movement of the rim strip relative to the inner tube 1.

Tests have demonstrated that the inner tube of my invention possesses a long life even under severe conditions of chafing occurring at the junction between the tire bead and the rim. Not only is injury to the inner tube prevented, but due to the relaxed state of these side portions, they are able in themselves to resist any deterioration of the strip.

As thus shown and described, it is believed that I have provided a novel combination which completely eliminates the danger of chafing of the inner tube with its resulting advantage in safety to the tire, to the vehicle, and to its occupants.

Having thus described my invention, what I claim and desire to protect by Letters Patent is:

1. An inner tube for supporting a pneumatic tire having beads on a rim comprising, in combination, an annular tube of rubber composition, that portion of the annular tube adjacent the rim and beads being provided with an exterior strip of rubber composition, the edges of the strip being joined with the annular tube and the remainder of the strip being separated therefrom, part of the separated portion of the strip being more extensible than the remaining portions so that upon inflation of the annular tube those portions of the strip adjacent the beads and rim will remain in a substantially unstretched condition to resist chafing and protect the annular tube.

2. An inner tube for supporting a pneumatic tire having beads on a rim comprising an annular tube of rubber composition, that portion of the annular tube adjacent the rim and beads having an overlying protective strip joined at its edges with the annular tube and being separated therefrom over its central region, part of the separated region having a thickness less than the remaining parts thereof to constitute it more extensible than said remaining parts, so that upon inflation of the annular tube those portions of the strip adjacent the beads and rim will remain in a substantially relaxed state to protect the annular tube against chafing.

3. An inner tube for supporting a pneumatic tire on a rim comprising an annular tube of rubber composition, that portion of the annular tube adapted to engage the junction between the rim and tire beads having an overlying exterior protective strip attached along its marginal portions to the annular tube and being free from attachment thereto over its central portion, the center part of the separated portion being perforated to make it more extensible than the remaining separated portions, so that upon inflation of the annular tube those portions of the strip engaging the junction between the rim and beads will remain in a substantially relaxed state to prevent chafing of the annular tube.

4. An inner tube for supporting a pneumatic tire on a wheel having a drop-center rim comprising an annular tube of rubber composition having an exterior rim strip overlying that portion of the annular tube adapted to engage the junction between the rim of the wheel and the beads of the tire, said strip being joined along its edges with the annular tube and the remainder of the strip being separated therefrom, the junction formed between the edges of the strip and the annular tube, when the tube is inflated within the tire, being located at a point between the rim diameter forming the tire bead seat and the outer diameter of the rim flange, the central portion of said strip having a thickness less than the side portions thereof, and the central portion also being perforated, so as to constitute it more extensible than the side portions, so that those portions of the strip engaging the junction between the wheel rim and tire beads will remain in a substantially unstretched condition to resist chafing and protect the annular tube.

ALFRED N. IKNAYAN.

REFERENCES CITED

The following references are of record in the file of this patent:

UNITED STATES PATENTS

| Number | Name | Date |
| --- | --- | --- |
| 1,279,001 | Rawdon et al. | Sept. 17, 1918 |
| 1,522,805 | Chappell | Jan. 13, 1925 |
| 1,564,397 | Armstrong | Dec. 8, 1925 |
| 2,198,008 | Iknayan | Apr. 23, 1940 |
| 2,231,182 | Eger | Feb. 11, 1941 |
| 2,233,004 | Fisher | Feb. 25, 1941 |

FOREIGN PATENTS

| Number | Country | Date |
| --- | --- | --- |
| 215,662 | Great Britain | May 15, 1924 |